June 5, 1934.   C. W. SHIPPEE   1,961,989
HOSE COUPLING
Filed July 16, 1931
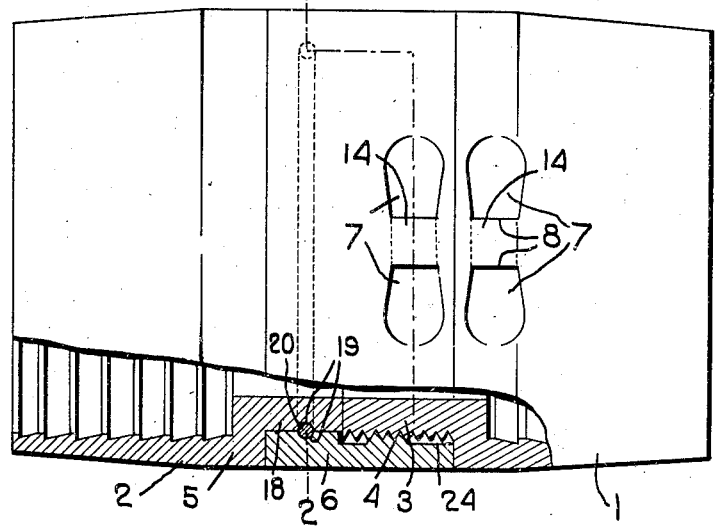
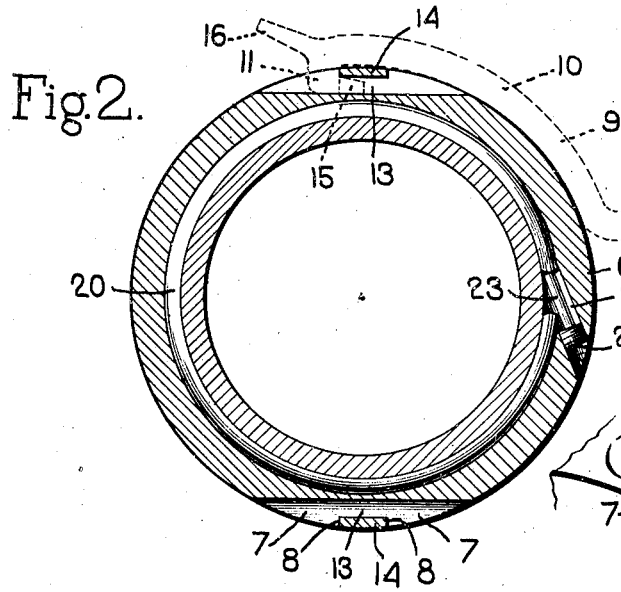
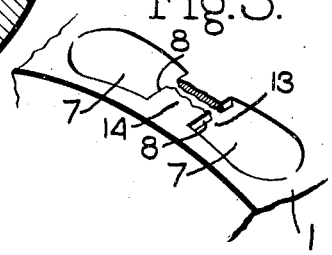
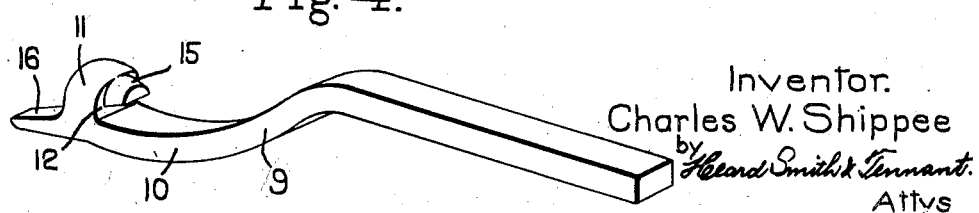
Inventor.
Charles W. Shippee
by Heard Smith & Tennant.
Attys Patented June 5, 1934

1,961,989

UNITED STATES PATENT OFFICE 1,961,989

HOSE COUPLING

Charles W. Shippee, Boston, Mass., assignor to Automatic Hose Coupling Company, Inc., Leominster, Mass., a corporation of Massachusetts Application July 16, 1931, Serial No. 551,103

2 Claims. (Cl. 285—75)

This invention relates to hose couplings especially designed for fire hose and the like and has for its object to provide a novel coupling which is so constructed that it is free from projections which hinder the manipulation of the hose in case of fire.

The ordinary hose coupling is formed with projections to which a suitable tool may be applied for screwing together or separating two coupling members. The presence of these projections is more or less objectionable because they are apt to interfere with carrying or dragging a hose to the location of a fire. If the hose is being drawn up a ladder or over a window sill such projections are very apt to catch on the ladder rungs or on the window sill and thus delay the operation of getting the hose to the location of the fire.

As stated above one object of my present invention is to provide a hose coupling of novel construction which is free from these objectionable projections but which is nevertheless so constructed that two coupling members can be quickly and tightly coupled together.

In carrying out my invention I provide the two coupling members with recesses which form at their ends shoulders situated below the peripheral surface of the coupling member and which are adapted to be engaged by a spanner or other tool by which the coupling members are tightened or loosened and I also provide a novel construction which prevents the spanner from slipping off from the shoulder during its use.

In these coupling members the female member is usually formed with a body section and a swivel section, the latter having the screw threads formed thereon.

Another feature of my invention relates to the manner of swivelling the swivel section to the body section.

In order to give an understanding of the invention I have illustrated in the drawing a selected embodiment thereof which will now be described after which the novel features will be pointed out in the appended claims.

Fig. 1 is a view partly in section of two coupling members made in accordance with my invention;

Fig. 2 is a section on the line 2—2, Fig. 1;

Fig. 3 is a fragmentary perspective view of the recessed portion of one coupling member;

Fig. 4 is a view of the spanner used.

In the drawing 1 indicates the male member of a hose coupling and 2 the female member. It will be understood, of course, that these coupling members are secured to the end of a fire hose (not shown) or a hose of some other type.

The male coupling member 1 is provided with the exteriorly screw-threaded portion 3 of reduced diameter and the female coupling member 2 is provided with the interiorly screw-threaded portion 4 adapted to be screw threaded to the screw-threaded portion 3 as shown in Fig. 1.

As usual in couplings of this type the female section is formed with a body portion 5 to which the hose is secured and with the swivel section 6 which is swivelled on the body section 5 and which is provided with the interior screw threads.

In the present invention each coupling member is provided in its peripheral surface with two opposed recesses 7, each recess forming at its inner end a shoulder 8 adapted to be engaged by a spanner 9 for the purpose of screwing the couplings together or unscrewing them from each other.

The spanner 9 is formed with the curved portion 10 adapted to rest on the curved surface of the coupling and with a head 11 of a shape to fit one of the recesses 7, said head having a shoulder 12 adapted to engage the shoulder 8 of the recess.

The two opposed recesses 7 are connected by an opening 13, as a result of which the two opposed recesses 7 are separated by the bridge 14. The ends of the bridge 14 form the shoulders 8 with which the shoulder 12 of the spanner has engagement.

The spanner is provided with a toe portion 15 projecting from the shoulder 12 which is adapted to enter the opening 13. The spanner thus is in the nature of a hook which hooks over the bridge 14 as shown by dotted lines in Fig. 1 with the shoulder 12 engaging the edge 8 of the bridge and the toe portion 15 fitting under the bridge. By this means the head 11 of the spanner is firmly held in the recess 7 while the spanner is used for turning the coupling member.

By having the recesses arranged in pairs as shown with the recesses of each pair in opposition the spanner can be used for turning the coupling member in either direction.

The spanner 9 is also provided at its end with a spur 16 which is designed to be used for cleaning out the recesses 7 in case they should become clogged with dirt, snow, ice or any foreign matter. This spur 16 is of a size to be entered into the opening 13 and this spur can be used as a punch for cleaning out the recesses 7 or for punching foreign matter from the opening 13.

The rear end of the swivel section 6 surrounds and overlaps the neck portion 18 of the body section 5 and this neck portion and the swivel section are provided with aligned grooves 19 in which is received a wire ring 20 by which the swivel section 6 is connected to the body section 5. This ring permits the swivel section to freely turn on the neck 18 but prevents separation of the two sections.

The swivel section 6 is provided with an inclined opening 21 which leads into the aligned grooves 19, said opening being somewhat larger than the aligned grooves. This opening is to provide for the introduction of the locking wire 20.

After the two parts 5 and 6 have been assembled the locking wire may be inserted through the opening 21 into the aligned grooves and forced into position as shown in Fig. 2.

The outer end of the opening 21 is screw threaded and is adapted to receive a screw-threaded plug 22 which is provided with an extension 23 when the plug is screwed into the opening 21. The extension 23 engages the end of the locking wire 20 as shown in Fig. 2 thereby retaining it in place.

I have herein shown the recesses 7 as tapering in width, the adjacent ends of the recesses being somewhat narrower than the opposite ends. The head 11 has a corresponding shape, that is, it is slightly narrower at the end which forms the shoulder 12 than at the opposite end. By reason of this tapering shape of recess and head the turning force applied to a coupling member when the spanner is used will be borne partially by the tapered side walls of the recess and partly by the shoulder 8.

In order to lessen the time necessary to couple the two coupling members together I may, if desired, omit some of the threads at the open end of the swivel section 6 as shown at 24 in Fig. 1, thereby reducing the number of threads formed in said section. The unthreaded portion 24 of the swivel section 6 constitutes a guiding portion which assists in guiding the male member into position so as to lessen the chance of cross threading the threads.

I claim:

1. A hose coupling member having an exterior surface free from projections and formed in its periphery with a pair of opposed recesses, the inner or adjacent walls of which provide spanner-engaging shoulders which are below the peripheral surface of the coupling member, the portion of the coupling between said adjacent walls having an opening therethrough extending from the inner wall of one recess to the inner wall of the other recess, which opening is adapted to receive a toe on a spanner which is provided with a head to fit the recess.

2. A hose coupling member having an exterior surface free from projections and formed in its outer face with a pair of opposed recesses separated a short distance from each other in a peripheral direction, each recess being deepest and narrowest at the inner end thereof adjacent the other recess, and having a progressively-decreasing depth from its deepest end to its other end, the walls of the two recesses adjacent each other constituting spanner-engaging shoulders and the portion of the coupling between said adjacent walls having an opening therethrough flush with the bottoms of the recesses, which opening is adapted to receive a toe on a spanner that is provided with a head to fit the recess.

CHARLES W. SHIPPEE.